United States Patent
Yu et al.

(10) Patent No.: US 7,195,390 B2
(45) Date of Patent: Mar. 27, 2007

(54) BACKLIGHT SYSTEM AND LIGHT GUIDE PLATE USED THEREIN

(75) Inventors: Tai-Cheng Yu, Tu-chen (TW); Charles Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 113 days.

(21) Appl. No.: 10/665,995

(22) Filed: Sep. 17, 2003

(65) Prior Publication Data

US 2004/0105251 A1    Jun. 3, 2004

(30) Foreign Application Priority Data

Nov. 29, 2002 (TW) ............................. 91219312 A

(51) Int. Cl.
*G02B 6/10* (2006.01)

(52) U.S. Cl. ............... 362/607; 362/600; 362/615; 385/146

(58) Field of Classification Search ............ 362/31, 362/600, 341, 615; 349/9, 115; 428/317; 385/146
See application file for complete search history.

(56) References Cited

U.S. PATENT DOCUMENTS

| 5,668,913 | A  | * | 9/1997  | Tai et al. ............. 385/146    |
| 5,835,661 | A  | * | 11/1998 | Tai et al. ............. 385/146    |
| 6,027,222 | A  |   | 2/2000  | Oki et al.                          |
| 6,445,504 | B1 |   | 9/2002  | Suga et al.                         |
| 6,497,946 | B1 | * | 12/2002 | Kretman et al. ...... 428/317.9     |
| 6,576,887 | B2 |   | 6/2003  | Watson et al.                       |
| RE38,305  | E  | * | 11/2003 | Gunjima et al. ............ 349/9   |
| 6,671,452 | B2 | * | 12/2003 | Winston et al. ........ 385/146     |
| 6,822,711 | B1 | * | 11/2004 | Yoshida et al. ........ 349/115     |

* cited by examiner

Primary Examiner—Sandra O'Shea
Assistant Examiner—Anabel Ton
(74) Attorney, Agent, or Firm—Wei Te Chung

(57) ABSTRACT

A backlight system (300) includes a light guide plate (3024), a reflection plate (3023), a light source (3021) disposed at one side of the light guide plate, a diffusion plate (3025) and a reflection polarizer (3027), which allows light polarized in one certain direction to pass, and reflects light polarized in a direction perpendicular to said one certain direction. The diffusion plate, the light guide plate, the diffusion plate, and the reflection polarizer are stacked up one on top of the other. A plurality of prisms (11) are disposed on a surface of the diffusion plate, thereby defining a plurality of V-shaped grooves (not labeled).

12 Claims, 5 Drawing Sheets

BACKLIGHT SYSTEM AND LIGHT GUIDE PLATE USED THEREIN

BACKGROUND OF THE INVENTION

1. Field of the Invention

The present invention relates to a backlight system, and particularly to a backlight system used for a liquid crystal display (LCD).

2. Description of Related Art

In an LCD, because liquid crystal is not a luminous element but is instead a control element regulating passage of light therethrough, a light source is needed. In most cases, the light source is combined with some other apparatus to become an integrated system that is called a backlight system or a front light system according to a direction of light emitted.

Referring to FIG. 6, a typical LCD assembly 100 comprises an LCD panel 101 and a backlight system 102. The backlight system 102 comprises a light source 1021, a light source cover 1022, a reflection plate 1023, a light guide plate 1024, and a reflection polarizer 1025. The light emitted from the light source 1021 enters the light guide plate 1024 directly, or indirectly by being reflected by the light source cover 1022. The reflection plate 1023 disposed under the light guide plate 1024 reflects light coming from the light guide plate 1024 back into the light guide plate 1024. Outgoing light from the light guide plate 1024 to the reflection polarizer 1025 is composed of different components of polarized light, i.e., P polarized light and S polarized light. The two polarized light components' polarization axes are perpendicular to each other. The S polarized light has proper polarization and passes through the reflection polarizer 1025, and is used to illuminate the LCD panel 101. The P polarized light is reflected by the reflection polarizer 1025 and reenters the light guide plate 1024. Reflected again by the reflection plate 1023, the P polarized light is turned into common light which can be seen as a combination of P polarized light and S polarized light as before, but just with a lower intensity. This common light is then directed to the reflection polarizer 1025 and is partly passed and partly reflected back. The process repeats again and again, so that the P polarized light reflected by the reflection polarizer 1025 is reused.

Although the P polarized light reflected by the reflection polarizer 1025 is reused, much of it is also lost in the process. This is because, when the P polarized light is reflected by the reflection polarizer 1025 to enter the light guide plate 1024, part of the P polarized light is absorbed by the light guide plate 1024. In addition, the residual light then also loses a little strength when it is reflected by the reflection plate 1023. In the whole recycling process, these losses cannot be ignored.

At the same time, the backlight system does not use a diffusing plate or other apparatus having a similar function to scatter the light. This causes an unevenness of the light emitted from the reflection polarizer 1025, so that illumination provided to the LCD panel 101 is not satisfactory.

Referring to FIG. 7, U.S. Pat. No. 6,448,955, issued Sep. 10, 2002, discloses an LCD assembly 200, which comprises a liquid crystal panel 201 and a backlight system 202. The liquid crystal panel 201 comprises a first plate 2011, a liquid crystal layer 2012, and a second plate 2013. The backlight system 202 comprises two light sources 2021, two corresponding light source covers 2022, two corresponding light guide plates 2024, a reflection plate 2023, a diffusion plate 2025, a brightness enhancing film 2026, a reflection polarizer 2027, and a special cover layer 2028.

In operation, the light emitted from the two light sources 2021 enters the two light guide plates 2024 directly, or indirectly after being reflected by the light source cover 2022. With the reflection plate 2023 disposed under the two light guide plates 2024, the outgoing light from the two light guide plates 2024 is directed to the diffusion plate 2025. Then the diffused light enters the brightness enhancing film 2026. The incident light at the reflection polarizer 2027 can be seen as a combination of two parts, i.e., the P polarized light and the S polarized light, and their polarization axes are perpendicular to each other. Having the proper polarization, the S polarized light passes through the reflection polarizer 2027 and is used to illuminate the LCD layer 2012; and the P polarized light is reflected by the reflection polarizer 2027 to enter the light guide plate 2024 through the brightness enhancing film 2026 and the diffusion plate 2025. Reflected by the reflection plate 2023, the P polarized light is turned into common light which can be seen as a combination of P polarized light and S polarized light, as before, but with a lower intensity. This common light is then directed to the reflection polarizer 2027, and is partly passed and partly reflected back. This process repeats again and again, so that the P polarized light reflected by the reflection polarizer 2027 is reused.

The addition of the diffusion plate 2025 makes the final light more uniform, and the use of the brightness enhancing film 2026 enhances the utilization efficiency of the light. However, there is still one problem unsolved. When the P polarized light is reflected by the reflection polarizer 2027 to enter the light guide plates 2024, part of the P polarized light is absorbed by the light guide plates 2024, and the residual light then loses a little intensity when it is reflected by the refection plate 2023. Given that there is a diffusion plate 2025 added to the system, in the whole process, the losses due to absorbance and reflection amount to a quite large proportion.

It is desirable to provide a backlight system and a light guide plate used therein which overcome the above problems.

SUMMARY OF THE INVENTION

An object of the present invention is to provide a backlight system that provides a uniform and more intense light, and consumes less power.

A backlight system of the present invention comprises a light source, a light guide plate, a reflection plate, a diffusion plate, and a reflection polarizer. The light source is disposed at one side of the light guide plate. The reflection plate, the light guide plate, the diffusion plate and the reflection polarizer are stacked one upon the other. A plurality of prisms are disposed on a surface of the diffusion plate, thereby defining a plurality of V-shaped grooves. The reflection polarizer allows light polarized in one certain direction (called S polarized light) to pass, and reflects light polarized in a direction perpendicular to said certain direction (called P polarized light).

The prisms can function as light conversion elements to turn the P polarized light reflected by the reflection polarizer into common light, which can be seen as a combination of the P polarized light and the S polarized light. Therefore the process of conversion is much simplified since only one reflection is used. The relatively large absorbance losses in light guide plates of the prior art is avoided, and the utilization efficiency of the light is enhanced.

Other objects, advantages and novel features of the present invention will become more apparent from the following detailed description when taken in conjunction with the accompanying drawings; in which:

DETAILED DESCRIPTION OF THE PREFERRED EMBODIMENT

Figure 1:
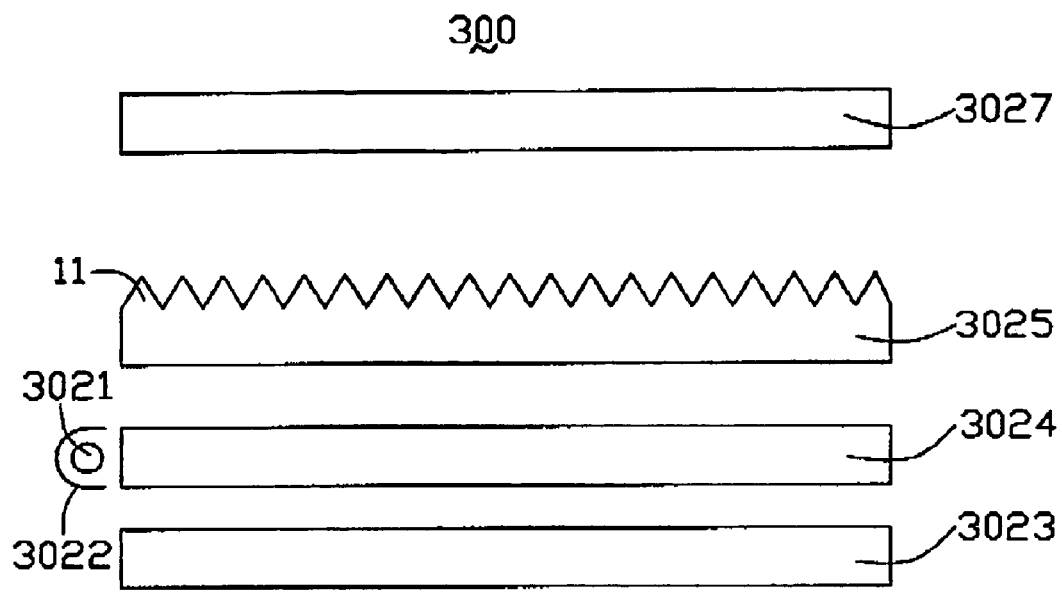
FIG. 1 is a side view of a first embodiment of a backlight system according to the present invention.

Referring to FIG. 1, a first embodiment of a backlight system 300 according to the present invention comprises a light source 3021, a light source cover 3022, a reflection plate 3023, a light guide plate 3024, a diffusion plate 3025, and a reflection polarizer 3027. The light source 3021 is disposed at one side of the light guide plate 3024, and is surrounded by the light source cover 3022 on three sides. The reflection plate 3023, the light guide plate 3024, the diffusion plate 3025 and the reflection polarizer 3027 are stacked up one on top of the other. A plurality of prisms 11 (see FIG. 3) are disposed on a surface of the diffusion plate 3025, thereby defining a plurality of V-shaped grooves (not labeled).

Figure 2:
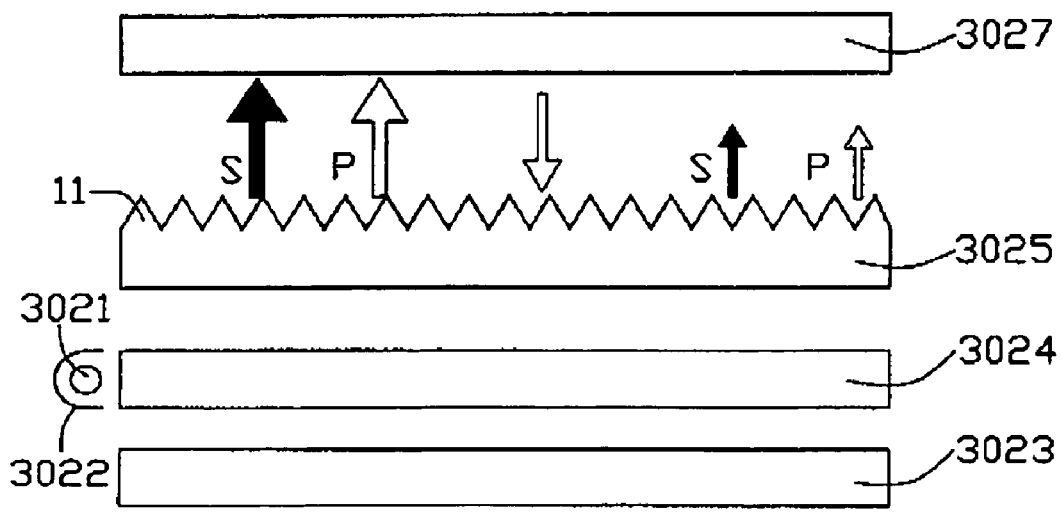
FIG. 2 is an optical paths schematic view of the backlight system in FIG. 1.

Referring to FIG. 2, the light emitted from the light source 3021 enters the light guide plate 3024 directly, or indirectly by being reflected by the light source cover 3022. With the reflection plate 3023 disposed under the light guide plate 3024, the light emitted from the light guide plate 3024 is directed to the diffusion plate 3025. The diffused incident light at the reflection polarizer 3027 can be seen as a combination of two parts, i.e., a P polarized light and an S polarized light, and their polarization axes are perpendicular to each other. Having a proper polarization state, the S polarized light passes the reflection polarizer 3027; and the P polarized light is reflected back by the reflection polarizer 3027 to the diffusion plate 3025. Reflected by the V-shaped grooves formed by the prisms 11 on the diffusion plate 3025, the P polarized light is turned into common light, which can be seen as the combination of the P polarized light and the S polarized light as before, but just with a lower intensity. This common light is then directed to the reflection polarizer 3027, and is partly passed and partly reflected back. This process repeats again and again, so that the P polarized light reflected by the reflection polarizer 3027 is reused.

The plurality of prisms 11 form V-shaped grooves, which serve as light conversion elements to turn P polarized light into common light only by reflection action. Unlike prior art devices, there is no light guide plate or diffusion plate in the light path. Thus, the conversion process generates only loss by reflection, and any losses that would otherwise be caused by absorption in a light guide plate or in a diffusion plate are obviated. Consequently, the utilization efficiency of the light is increased.

Figure 3:
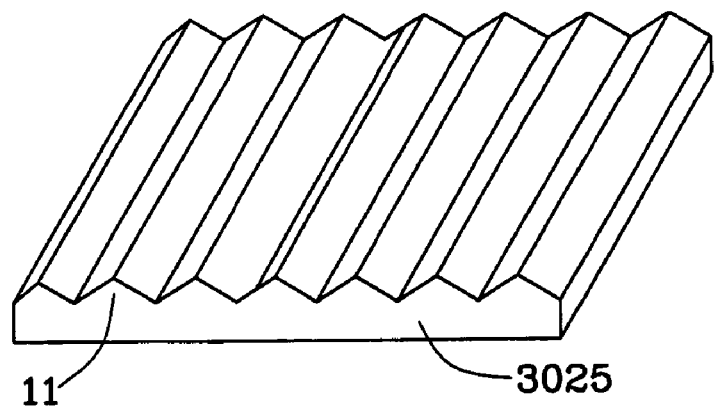
FIG. 3 is a perspective view of prisms on a diffusion plate of the backlight system according to the present invention.

Referring to FIG. 3, the plurality of prisms 11 are disposed parallel on a surface of the diffusion plate 3025 at equal intervals, thereby defining a plurality of V-shaped grooves (not labeled).

Figure 4:
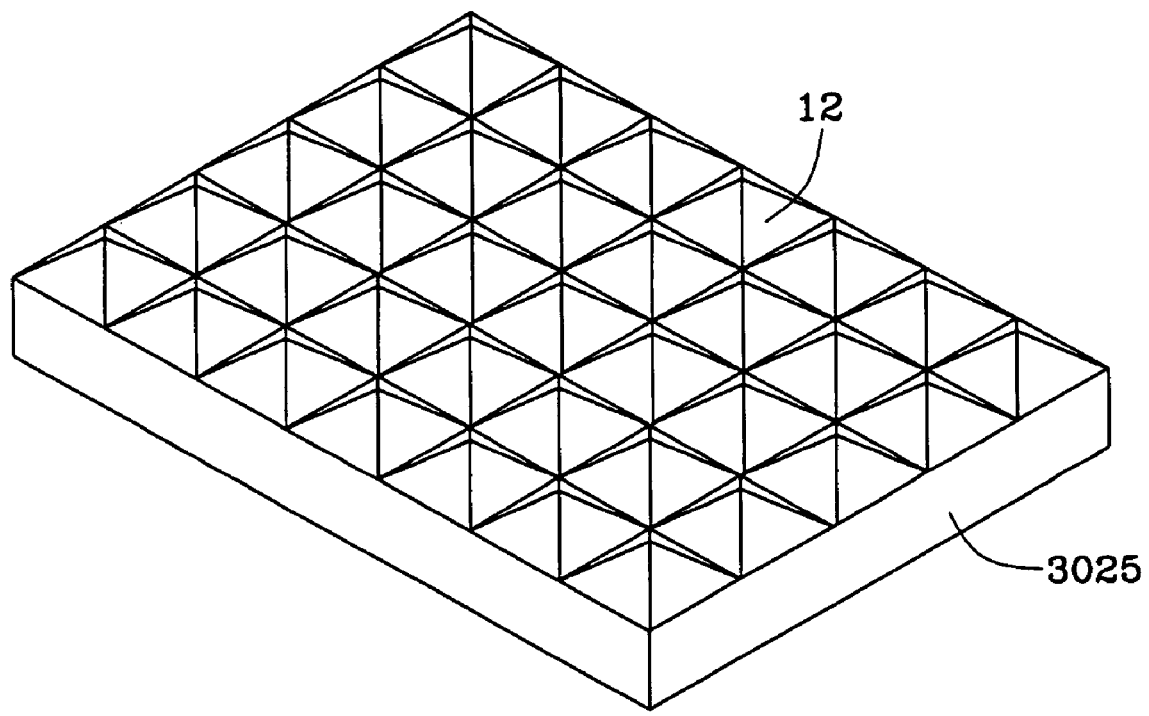
FIG. 4 is a perspective view of another form of prisms on the diffusion plate of a backlight system according to the present invention.

Referring to FIG. 4, a plurality of pyramid-shaped prisms 12 are disposed evenly on a surface of the diffusion plate 3025, thereby defining V-shaped parallel grooves in two perpendicular directions on a surface of the diffusion plate 3025.

Figure 5:
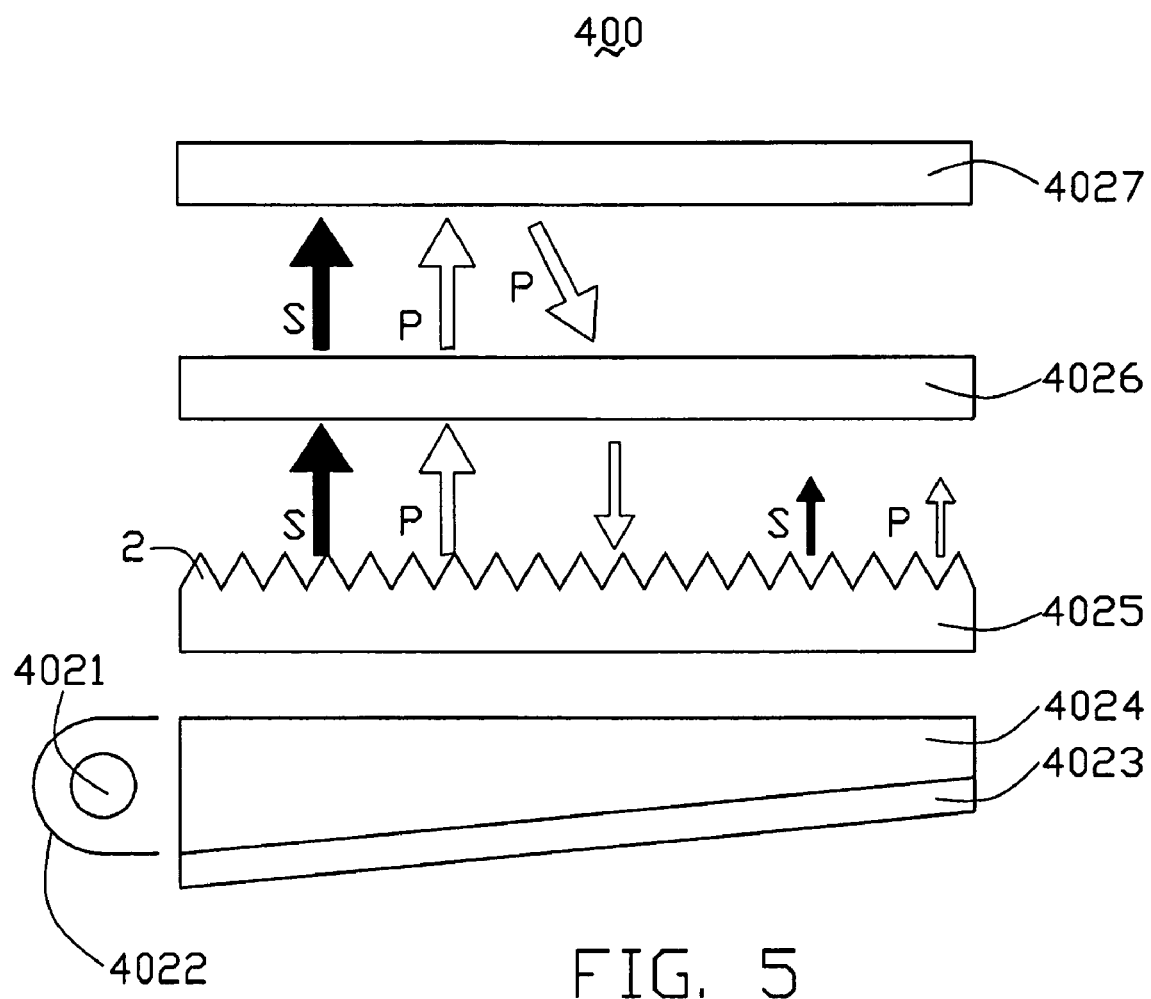
FIG. 5 is a side view of a second embodiment of a backlight system according to the present invention.
Figure 6:
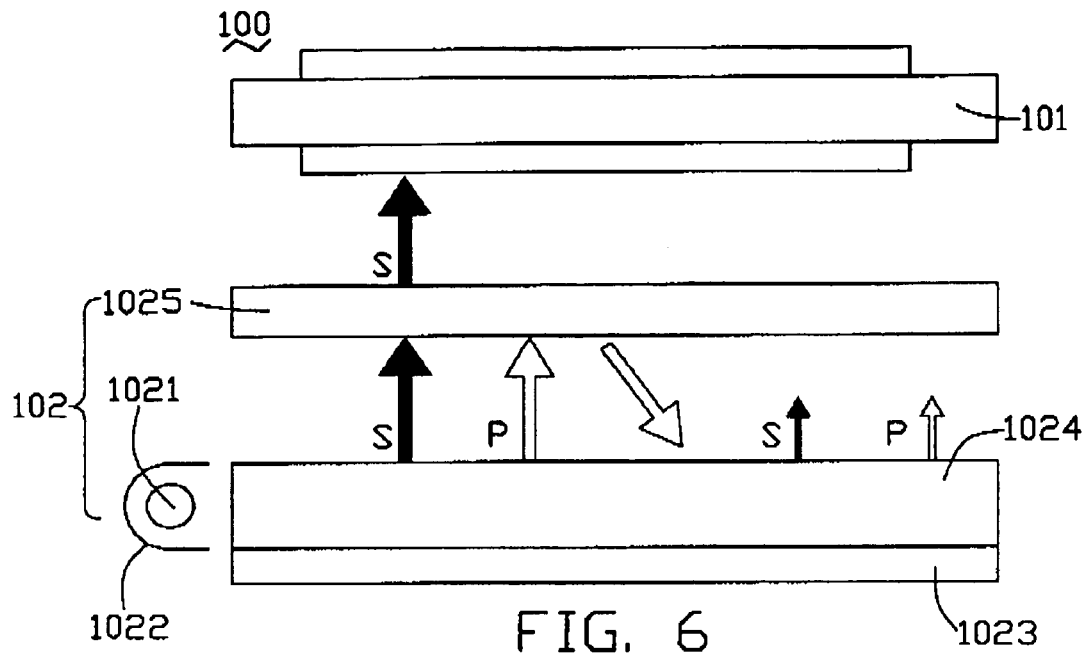
FIG. 6 is a cross-sectional view of a conventional liquid crystal display assembly.
Figure 7:
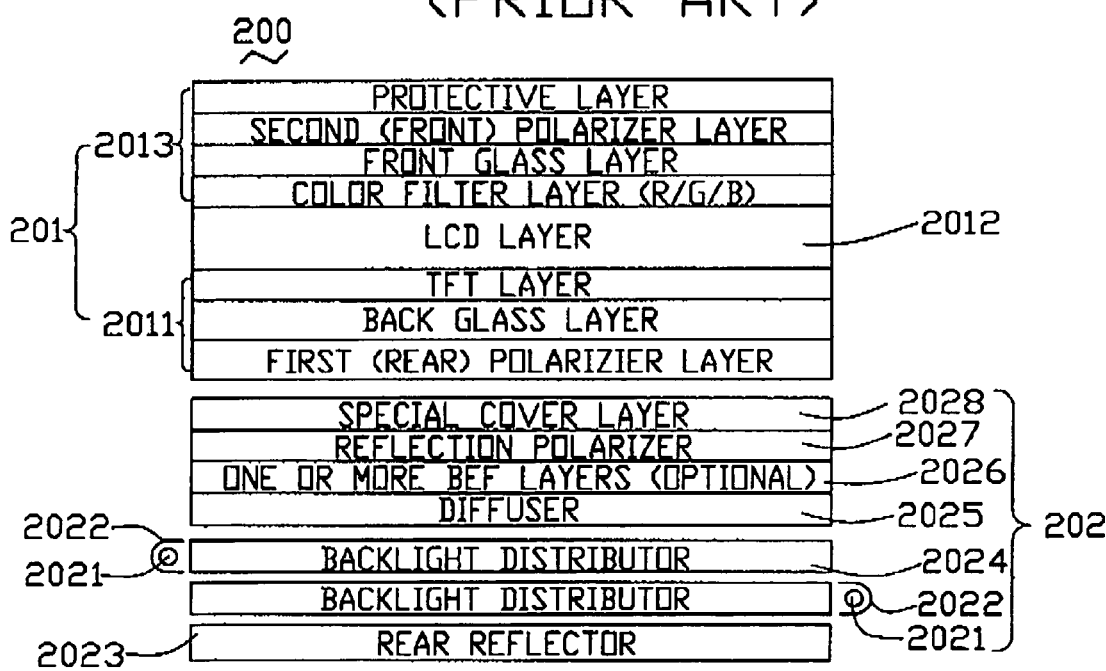
FIG. 7 is a cross-sectional view of another conventional liquid crystal display assembly.
Figure 8:
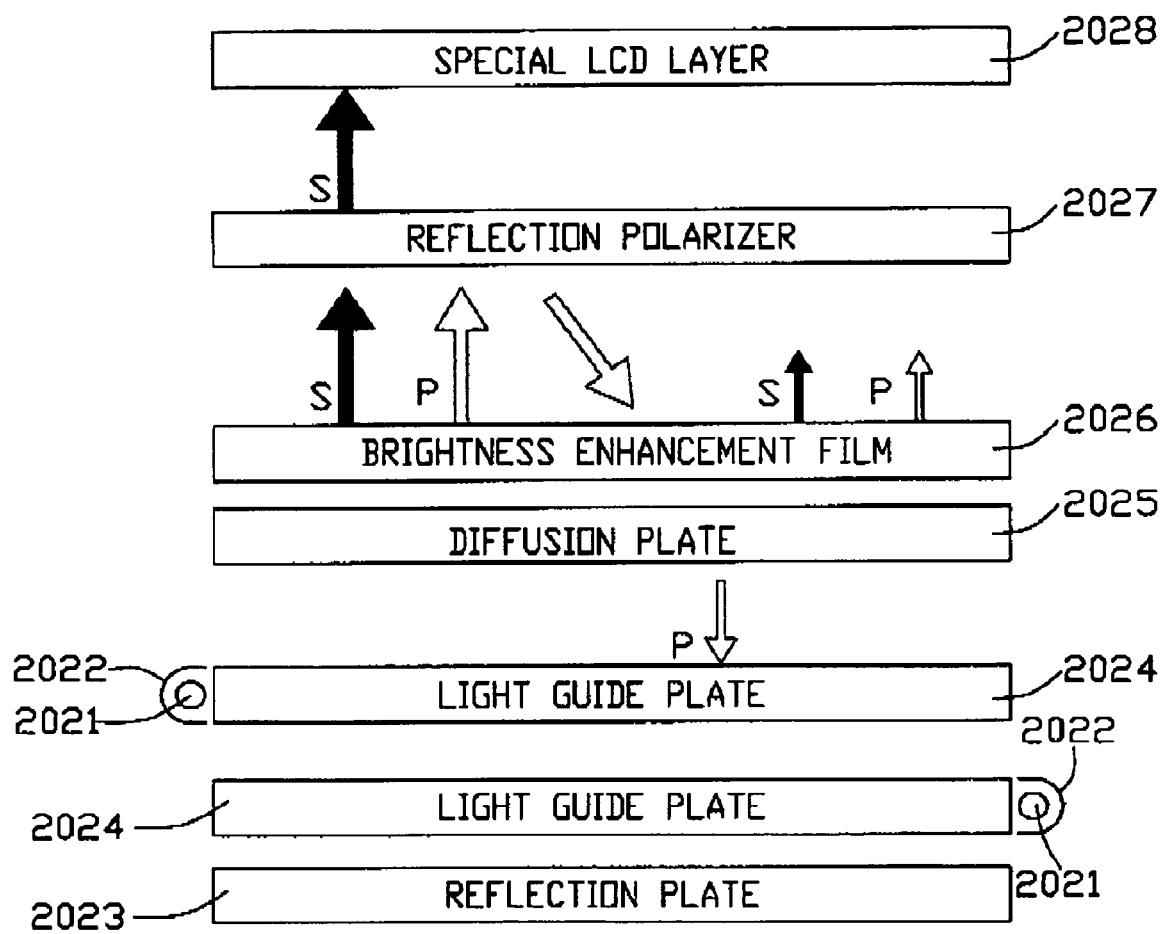
FIG. 8 is an exploded view of part of the liquid crystal display assembly of FIG. 7, showing essential optical paths thereof.

Referring to FIG. 5, a second embodiment of a backlight system 400 according to the present invention comprises a light source 4021, a light source cover 4022, a reflection plate 4023, a wedge shaped light guide plate 4024, a diffusion plate 4025, a brightness enhancing film 4026, and a reflection polarizer 4027. The light source 4021 is disposed at a wider side of the light guide plate 4024, and is surrounded by the light source cover 4022 on three sides. The reflection plate 4023, the light guide plate 4024, the diffusion plate 4025, the brightness enhancing film 4026 and the reflection polarizer 4027 are stacked up one on top of another. The V-shaped grooves formed by the prisms 2 on the light diffusion plate 4025 are a light conversion element which has a same function as in the first embodiment.

The differences between the first and second embodiments comprise three points. The first is the usage of the wedge shaped light guide plate 4024 instead of the flat plate 3024; the second is the reflection film 4023 being formed on the light guide plate 4024 as a substitute for the reflection plate 3023; and the third is the addition of the brightness enhancing plate 4026 between the diffusion film 4025 and the reflection polarizer 4027.

Accomplishing the light conversion with the grooves formed by the prisms 2, the second embodiment also avoids light absorption by a light guide plate or a light diffusion plate as manifested in prior art. Compared with the first embodiment, the wedge-shaped light guide plate and the reflection film of the second embodiment altogether allow the backlight system to occupy less space while retaining or even enhancing the reflection effect, because the wedge shape of the light guide plate can result in a more uniform reflection. The addition of the brightness enhancing plate can enhance the utilization efficiency of the light while only requiring a slightly larger volume. Therefore the second embodiment provides a higher intensity light and occupies less space. It could be applied to high end products, in which performance is considered relatively more important than price.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:
1. A backlight system, comprising:
   a light guide plate;
   at least a light source;
   a diffusion plate located above said light guide plate; and a reflection polarizer which allows S polarized light to pass while reflecting P polarized light, the reflection polarizer being located above the diffusion plate; wherein the light guide plate, the diffusion plate and the reflection polarizer are stacked one on another in sequence, and a plurality of light conversion elements are configured at an outside of the diffusion plate to transform the reflected P polarized light thereabouts to a common light and successively redirect the common light toward the reflection polarizer without substantial involvement of the diffusion plate and the light guide plate, said outside of the diffusion plate facing toward the reflection polarizer and being opposite to the portion of diffusion plate stacked on the light guide plate.

2. A method of making a backlight system, comprising steps of:

providing a light guide plate;
positioning a light source beside said light guide plate;
positioning a diffusion plate above said light guide plate;
positioning a reflection polarizer above said diffusion plate which allows S polarized lights light to pass and reflects P polarized lights light; and
forming a plurality of light conversion elements on an outside surface of said diffusion plate, so as to transform the reflected P polarized light to a common light thereabouts and successively redirect the common light toward the reflection polarizer without substantial involvement of at least said light guide plate, said outside surface of the diffusion plate facing toward the reflection polarizer and being opposite to the portion of diffusion plate positioned above the light guide plate.

3. A backlight system, comprising:

a light guide plate;
a diffusion plate located above said light guide plate; and
a reflection polarizer which allows light polarized in one certain direction to pass while reflecting light polarized in a direction perpendicular to the certain direction, the reflection polarizer being located above the diffusion plate; wherein the light guide plate, the diffusion plate and the reflection polarizer are stacked one on another in sequence, and a plurality of light conversion elements are configured at an outside surface of the diffusion plate, said outside surface of the diffusion plate facing toward the reflection polarizer and being opposite to the portion of diffusion plate stacked on the light guide plate.

4. The backlight system as claimed in claim 1, wherein the light conversion elements are in the form of prisms disposed parallel to one another.

5. The backlight system as claimed in claim 4, wherein the prisms are spaced apart at equal intervals.

6. The backlight system as claimed in claim 4, wherein the prisms are each in a shape of a pyramid and are distributed evenly.

7. The backlight system as claimed in claim 1, further comprising a light source cover which surrounds the light source on three sides.

8. The backlight system as claimed in claim 1, wherein the light guide plate is a flat plate.

9. The backlight system as claimed in claim 1, wherein the light guide plate is in a shape of a wedge.

10. The backlight system as claimed in claim 3, wherein the light conversion elements are in the form of prisms disposed parallel to one another.

11. The backlight system as claimed in claim 10, wherein the prisms are spaced apart at equal intervals.

12. The backlight system as claimed in claim 10, wherein the prisms are each in a shape of a pyramid and are distributed evenly.

* * * * *